United States Patent Office 3,344,092
Patented Sept. 26, 1967

3,344,092
FOAMABLE STYRENE POLYMER COMPOSITIONS CONTAINING A MIXTURE OF A CARBONATE AND A BICARBONATE AS BLOWING AGENTS
Frank Eugene Pavuk, Aliquippa, Pa., assignor to Koppers Company, Inc., a corporation of Delaware
No Drawing. Filed Apr. 22, 1965, Ser. No. 450,164
8 Claims. (Cl. 260—2.5)

This invention relates to a novel extrudable, expandable styrene polymer composition. It further relates to a method for the production of styrene polymer foam structures having small, uniform internal cells.

Polymer compositions such as are described in Houston and Tress, Patent No. 2,941,964, can be extruded to produce foamed plastic structures. The compositions contain, as the expanding system, an aliphatic blowing agent and a blowing agent adjunct. Sufficient blowing agent adjunct, comprised of a carbon dioxide liberating agent such as sodium bicarbonate and an organic acid having at least 3.0 milliequivalents of acetic hydrogen per gram, is present based on the weight of polymer to produce upon reaction a total of from about 0.02 to 6.0 percent by weight of water and carbon dioxide.

Organic acids described in Patent No. 2,941,964 as suitable for use in the blowing agent adjunct are citric, oxalic, malonic, maleic, fumaric, succinic, itaconic, citraconic, malic, adipic, formic, acetic, propionic, tartaric, phthalic butyric, lactic, chloracetic and diglycollic.

Carbon dioxide liberating agents described in Patent No. 2,941,964 as suitable for use in the blowing agent adjunct are the alkali and alkaline earth carbonates and bicarbonates illustrated by such compounds as, for example, lithium sodium, potassium, calcium strontium, barium, and ammonium carbonates and bicarbonates.

The blowing agent adjunct not only provides gases which aid in expanding the polymer but also acts as a nucleating agent in providing sites for the formation of small, uniform cells.

These expanding systems have been successful in producing foams of the required low densities and small cell size from polystyrene where temperatures in the extruder do not exceed 375° F. However, when the organic acid bicarbonate or carbonate blowing agent adjunct is used with certain higher softening copolymer compositions which must be heated to melt temperatures above 375° F., it has been found that large and irregular cells are produced in the foam structure. The higher softening copolymer compositions must be heated in the barrel of the extruder to temperatures above 375° F. in order to obtain a homogeneous, heat plastified mass prior to extrusion. Although the heat plastified mass is then cooled to temperatures at the die orifice which are normally required to produce low density foamed structures, i.e., 250–375° F., the foam is made up of large, irregular cells. Apparently, the blowing agent adjunct undergoes a chemical change when heated in the extruder to temperatures above 375° F. Therefore, when the polymer is extruded, the blowing agent adjunct fails to act as a nucleating agent.

It has now been found that the cell size of extruded styrene polymer foam compositions requiring melt temperatures above 375° F. can be greatly improved by a new synergistic combination of carbonate and bicarbonate in the expanding system.

In accordance with this invention, the extrusion of a mixture of a liquefied styrene polymer containing a novel expanding system consisting of an organic acid and a synergistic carbon dioxide liberating combination of an alkali or alkaline earth bicarbonate, e.g., sodium bicarbonate and an alkali or alkaline earth carbonate, e.g., sodium carbonate, in which the ratio of the weight percent carbonate to bicarbonate ranges from about 1:2 to 3:2, produces a foamed structure having small, uniform cells when subjected to melt temperatures above about 375° F.

The carbon dioxide liberating combination must be present in a specific ratio to produce the desired result. This ratio of weight percent carbonate to bicarbonate is from about 1:2 to 3:2. Polymer compositions containing only organic acid and bicarbonate result in foams comprised of very large cells when subjected to melt temperatures in the extruder above about 375° F. Similarly, the use of carbonate and organic acid resulted in foams having very large cells. Although particularly excellent results are obtained with the sodium carbonate and sodium bicarbonate combination, other alkali and alkaline earth carbonates and bicarbonates can be used.

Advantageously the novel expanding system is added in amounts sufficient to produce upon reaction a total of from 0.1–15 percent by weight, based on polymer of water and carbon dioxide.

Foams having satisfactory densities for most purposes can be prepared by the use of the organic acid and the carbonate-bicarbonate expanding system alone. If foams of ultra-low density are desired, the expanding system can be used in conjunction with from 1 to 15 percent by weight based on polymer of an aliphatic blowing agent. Aliphatic hydrocarbons and their halogenated derivatives that are useful as blowing agents are those which boil below the softening point of the polymer such as propane, butane, pentane, hexane, heptane, cyclohexane and halogen derivatives of methane and ethane.

The invention is further illustrated by the following examples in which the term "parts" indicate parts by weight based on polymer.

*Example I–A*

One part of "Dylene 8" polystyrene beads (an injection molding grade of polystyrene) and one part of "Dylene KPD–895" (a graft copolymer containing 6 percent polybutadiene and 94 percent styrene) were mixed on a ribbon blender with 0.008 part citric acid, 0.008 part sodium bicarbonate and 0.010 part sodium carbonate so that a homogeneous mixture of polymer and expanding system components resulted.

*Example I–B*

The composition prepared in Example I–A was extruded in a conventional plastic extruder (3½" National Rubber Machinery Corporation extruder with a 33:1 length to diameter ratio). The composition was heat plastified and mixed in the barrel of the extruder at a melt temperature of 380° F. The composition was then cooled in the forward section of the extruder prior to being extruded through an annular die at a temperature of 325° F. as a foamed tubular sheet about 50 mils in thickness. The sheet had small uniform cells of approximately 0.005 inch in diameter. The sheet had a density of 25.0 pounds per cubic foot.

*Example II*

Examples I–A and I–B are repeated except that a blowing system of 0.006 part citric acid, 0.016 part sodium bicarbonate and 0.009 part sodium carbonate was employed in the polymer composition. The extruded foam sheet was about 40 mils thick and again had a small uniform cell structure with a cell size of approximately 0.005 inch in diameter but in this case a density of 20.8 pounds per cubic foot.

*Example III*

One part styrene copolymer beads consisting of a graft copolymer of 85 percent styrene monomer copolymerized with .15 part of a styrene-butadiene rubber (75–25% by weight) was mixed in a ribbon blender with 0.003 part oxalic acid dihydrate, 0.003 part potassium bicarbonate and 0.0017 part sodium carbonate.

*Example III–A*

The composition prepared in Example III was heat plastified to give a homogeneous melt in the barrel of a conventional plastics extruder at a melt temperature of 425° F. The melt was then cooled prior to being extruded through an annular orifice, at a temperature at the die of 350° F. A polystyrene foam sheet of about 30 mils thickness was formed which had small uniform cells approximately 0.005 inch in diameter and a foam density of 25.0 pounds per cubic foot.

As previously stated it is possible to produce a styrene polymer foam having small, uniform cells using the organic acid, carbonate, and bicorbonate expanding system. However, the invention functions equally well to produce foams of very low density, below 3 pounds per cubic foot, by the addition of an aliphatic hydrocarbon blowing agent as illustrated in Example IV and IV–A.

*Example IV*

One part "F-40B Dylite" expandable polystryrene beads (an expandable foam of polystyrene containing about 7.0 percent by weight of n-pentane) and one part "Dylene KPD 895" were admixed on a ribbon blender with 0.008 part citric acid, 0.008 part sodium bicarbonate, and 0.010 part calcium carbonate until a uniform mixture was obtained.

*Example IV–A*

The composition prepared in Example IV was heat plastified and thoroughly mixed in the barrel of a conventional plastics extruder at a melt temperature of 380° F. The melt was cooled and extruded through an annular orifice at a temperature of 300° F. A styrene polymer foam film having a density of 2.5 pounds per cubic foot and a thickness of about 100 mils was produced which contained uniform cells of approximately 0.005 inch in diameter.

*Example V*

One part "Dylene 8" crystalline polystyrene beads and one part "Dylene KPD–825" pellets were admixed in a ribbon blender with 0.008 part citric acid and 0.018 part sodium bicarbonate. This mixture was extruded in a conventional plastic extruder employing the same temperatures as in Example I-B. The resulting foamed styrene polymer has a non-uniform cell structure of very large cells over 10 times the diameter of the cells produced in Examples I–A and II and was unacceptable for commercial use.

*Example VI*

Example V was repeated except there was substituted for the sodium bicarbonate, 0.018 part of sodium carbonate. The resulting foam polymer as in Example V consisted of large and irregular cells.

The term "styrene polymer" as used in connection with this invention includes a wide variety of homopolymers and copolymers produced by polymerizing vinyl aromatic monomers such as styrene, divinyl benzene, vinyl toluene, isopropyl styrene, alpha-methyl styrene, nuclear dimethyl styrene, chlorostyrene, vinyl naphthalene, etc. as well as copolymers of vinyl aromatic monomers prepared by polymerizing vinyl aromatic monomers with copolymers or polymers containing styrene, butadiene, isobutylene, acrylonitrile, itaconic acid, methyl methacrylate, etc. or by mechanically mixing two or more of such polymers and copolymers.

The foregoing has described a novel expanding system for styrene polymers which produces foam polymers having a small, uniform cell size of approximately 0.005 inch in diameter without requiring the presence of other blowing agents. The expanding system affords a satisfactory nucleating system even when operating maximum melt temperatures above about 375° F. which must be used when extruding the high softening, high impact varieties of styrene copolymers.

I claim:
1. A method of producing a foam structure having small, uniform cells comprising:
   (a) homogeneously admixing a styrene polymer with a solid organic acid having at least about 3.0 milliequivalents of acidic hydrogen per gram and a synergistic carbon dioxide liberating agent combination, said combination comprising a bicarbonate selected from the group consisting of alkali and alkaline earth bicarbonates and a carbonate selected from the group consisting of alkali and alkaline earth carbonates in which the ratio of weight percent carbonate to bicarbonate ranges from about 1:2 to 3:2 and thereafter
   (b) simultaneously foaming and extruding said mixture to produce a foam structure.

2. The method of claim 1 in which the bicarbonate is sodium bicarbonate and the carbonate is sodium carbonate.

3. The method of claim 1 in which said acid and said synergistic carbon dioxide liberating agent combination are present in amounts sufficient to produce upon reaction a total of from about 0.10 to 15 percent by weight, based on said styrene polymer, of water and carbon dioxide.

4. A method of producing a foam structure having small, uniform cells comprising:
   (a) homogeneously admixing a styrene polymer with a solid organic acid having at least about 3.0 milliequivalents of acidic hydrogen per gram and a synergistic carbon dioxide liberating agent combination, said combination comprising a bicarbonate selected from the group consisting of alkali and alkaline earth bicarbonates and a carbonate selected from the group consisting of alkali and alkaline earth carbonates in which the ratio of weight percent carbonate to bicarbonate ranges from about 1:2 to 3:2, said acid and said liberating agent combination being present in amounts sufficient to produce upon reaction a total of from about 0.10 to 15 percent by weight, based on said styrene polymer, of water and carbon dioxide,
   (b) heat plastifying said mixture at a temperature above about 375° F. and thereafter
   (c) simultaneously foaming and extruding said mixture to produce a foam structure.

5. A composition capable of being foamed and extruded comprising a homogeneous admixture of styrene polymer and an expanding system comprising a solid organic acid having at least about 3.0 milliequivalents of acidic hydrogen per gram and a synergistic carbon dioxide liberating agent combination comprising a bicarbonate selected from the group consisting of alkali and alkaline earth bicarbonates and a carbonate selected from the group consisting of alkali and alkaline earth carbonates in which a ratio of weight percent of carbonate to bicarbonate ranges from about 1:2 to 3:2.

6. The composition of claim 5 in which the bicarbonate is sodium bicarbonate and the carbonate is sodium carbonate.

7. The composition of claim 5 in which said acid and said carbon dioxide liberating agent combination are present in amounts sufficient to produce upon reaction a total of from 0.10 to 15 percent by weight, based on said styrene polymer, of water and carbon dioxide.

8. In a composition capable of being formed and extruded to produce a foam structure comprising a homogeneous admixture of a styrene polymer, a blowing agent selected from the group consisting of aliphatic hydrocarbons and their halogenated derivatives boiling below the melting point of said polymer and a blowing agent adjunct comprising a carbon dioxide liberating agent chosen from a class consisting of the alkali and alkaline earth carbonates and bicarbonates and a solid organic acid having at least about 3.0 milliequivalents of acidic hydrogen per gram, the improvement comprising a blowing agent adjunct combination consisting essentially of a bicarbonate selected from the group consisting of alkali and alkaline earth bicarbonates and a carbonate selected from the group consisting of alkali and alkaline earth carbonates in which the ratio of weight percent carbonate to bicarbonate ranges from about 1:2 to 3:2.

References Cited

UNITED STATES PATENTS 2,941,964  6/1960  Houston et al. _____ 260—2.5

SAMUEL H. BLECH, *Primary Examiner.*

J. C. BLEUTGE, *Assistant Examiner.*